US012795023B2

(12) United States Patent
Takahashi

(10) Patent No.: US 12,795,023 B2
(45) Date of Patent: Nov. 10, 2026

(54) IMAGE FORMING APPARATUS FOR DEFECT ANALYSIS OF AN IMAGE IN WHICH CONFIDENTIAL DATA IS INCLUDED

(71) Applicant: FUJIFILM Business Innovation Corp., Tokyo (JP)

(72) Inventor: Kazuya Takahashi, Kanagawa (JP)

(73) Assignee: Tokyo Business Innovation Corp., Tokyo (JP)

( * ) Notice: Subject to any disclaimer, the term of this patent is extended or adjusted under 35 U.S.C. 154(b) by 0 days.

(21) Appl. No.: 18/188,472

(22) Filed: Mar. 23, 2023

(65) Prior Publication Data

US 2024/0089379 A1 Mar. 14, 2024

(30) Foreign Application Priority Data

Sep. 8, 2022 (JP) ................................ 2022-143265

(51) Int. Cl.
*H04N 1/00* (2006.01)

(52) U.S. Cl.
CPC ..... *H04N 1/00039* (2013.01); *H04N 1/00005* (2013.01); *H04N 1/00034* (2013.01); *H04N 1/00082* (2013.01); *H04N 1/0009* (2013.01); *H04N 2201/0094* (2013.01)

(58) Field of Classification Search
CPC ........... H04N 1/00082; H04N 1/00074; H04N 1/4446; G06F 21/608
See application file for complete search history.

(56) References Cited

U.S. PATENT DOCUMENTS 10,802,771 B2 10/2020 Soejima et al.
2010/0296113 A1* 11/2010 Fujii ..................... G06F 3/1234 358/1.9
2014/0293363 A1* 10/2014 Hiramatsu ........... H04N 1/0005 358/406
2017/0187897 A1* 6/2017 Shin ...................... G06F 11/006
2018/0146119 A1* 5/2018 Nakamura ............... H04N 1/44
2019/0138254 A1* 5/2019 Itou ....................... G06F 3/1282
2020/0267280 A1* 8/2020 Tong ................... G06F 21/6209
2022/0067957 A1* 3/2022 Majumder ................ G06T 7/73

FOREIGN PATENT DOCUMENTS

JP 2009169504 7/2009
JP 2012051296 3/2012
JP 2015085533 5/2015
JP 2019089246 6/2019

OTHER PUBLICATIONS

"Search Report of Europe Counterpart Application", issued on Jan. 26, 2024, pp. 1-8.
"Notice of Reasons for Refusal of Japan Counterpart Application", issued on Aug. 4, 2026, with English translation thereof, p. 1-p. 7.

* cited by examiner

*Primary Examiner* — Benjamin O Dulaney
(74) *Attorney, Agent, or Firm* — JCIPRNET

(57) ABSTRACT

An image forming apparatus includes a processor configured to generate second image forming data for defect analysis in which confidential data included in first image forming data is invisible in a case where a defect occurs in image forming processing of the first image forming data, execute the image forming processing for the generated second image forming data, and output defect analysis data corresponding to a processing result of the image forming processing executed for the second image forming data.

7 Claims, 4 Drawing Sheets

IMAGE FORMING APPARATUS FOR DEFECT ANALYSIS OF AN IMAGE IN WHICH CONFIDENTIAL DATA IS INCLUDED

CROSS-REFERENCE TO RELATED APPLICATIONS

This application is based on and claims priority under 35 USC 119 from Japanese Patent Application No. 2022-143265 filed Sep. 8, 2022.

BACKGROUND

(i) Technical Field

The present disclosure relates to an image forming apparatus, a non-transitory computer readable medium storing an image forming program, and an image forming method.

(ii) Related Art

JP2012-51296A discloses an image forming apparatus that includes image data conversion unit that converts print data into print image data in a printing apparatus that prints out the print data received from a higher-level apparatus. The image data conversion unit includes a text data replacement unit, the image data conversion unit determines whether or not an instruction about a replacement mode of text data is given, and the text data conversion unit generates a random text code by a random number, and generates the print image data by text font data corresponding to the generated text code in a case where the replacement mode is set.

SUMMARY

Aspects of non-limiting embodiments of the present disclosure relate to an image forming apparatus, a non-transitory computer readable medium storing an image forming program, and an image forming method that can efficiently perform analysis of a defect as compared with a case where image forming data in which confidential data is replaced with another data is used as defect analysis data as it is without executing image forming processing of the image forming data in a case where a defect occurs in image forming processing of image forming data including confidential data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to generate second image forming data for defect analysis in which confidential data included in first image forming data is invisible in a case where a defect occurs in image forming processing of the first image forming data, execute the image forming processing for the generated second image forming data, and output defect analysis data corresponding to a processing result of the image forming processing executed for the second image forming data.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment for implementing a technology of the present disclosure will be described in detail with reference to the drawings. Components and processing having the same operations, actions, and functions are given the same reference symbols throughout the drawings, and redundant descriptions may be omitted as appropriate. Each drawing is only schematically illustrated to the extent that the technology of the present disclosure can be fully understood. Thus, the technology of the present disclosure is not limited only to the illustrated examples. In the present exemplary embodiment, descriptions of configurations that are not directly related to the technology of the present disclosure and well-known configurations may be omitted.

Figure 1:
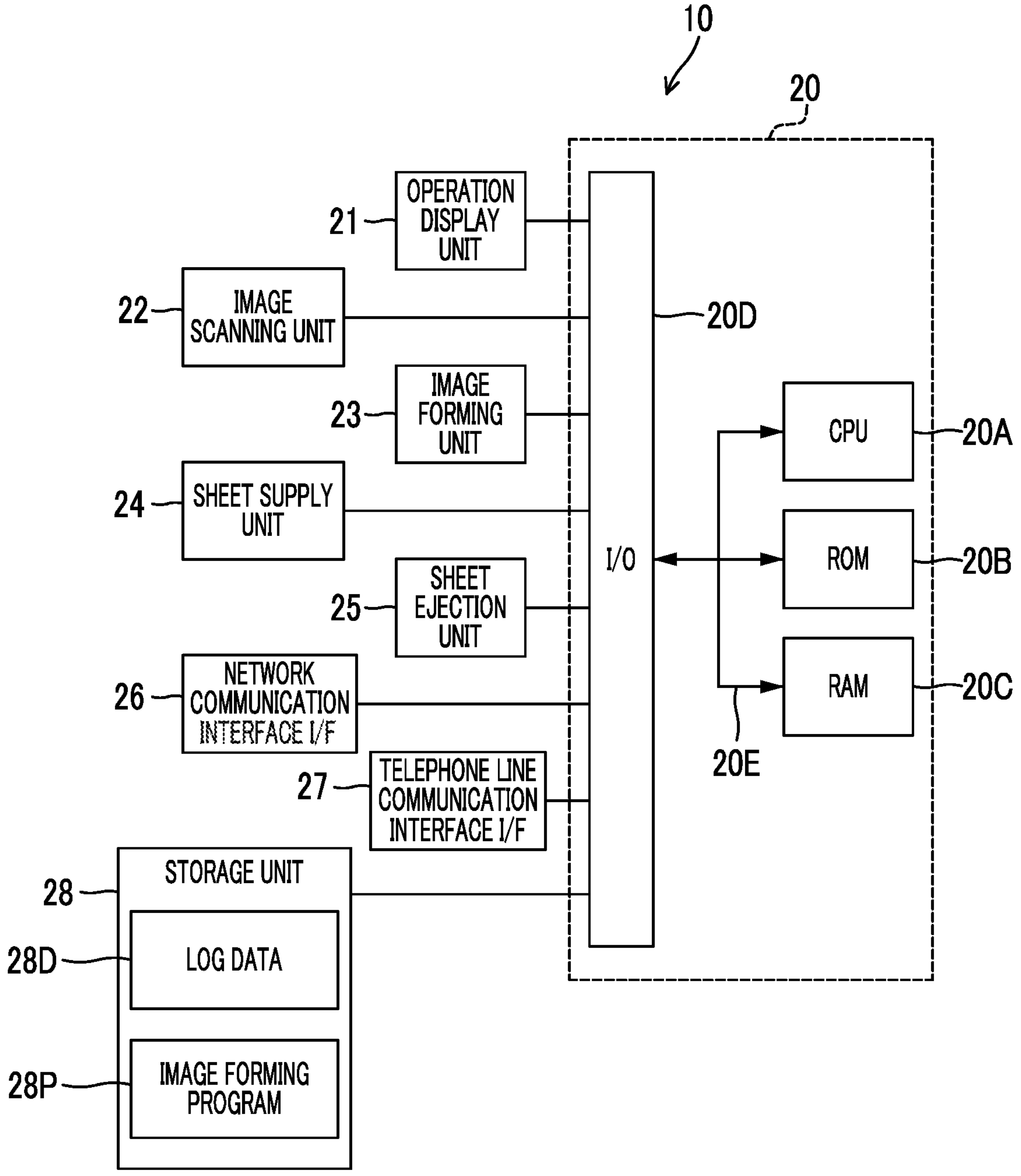
FIG. 1 is a diagram illustrating a schematic configuration of an image forming apparatus.

FIG. 1 illustrates a schematic configuration of an image forming apparatus 10 according to the present exemplary embodiment. As shown in FIG. 1, the image forming apparatus 10 includes a computer 20.

The computer 20 has a configuration in which a central processing unit (CPU) 20A, a read only memory (ROM) 20B, a random access memory (RAM) 20C, and an input and output interface (I/O) 20D are connected to each other via a bus 20E. The CPU 20A is an example of a processor.

Functional units such as an operation display unit 21, an image scanning unit 22, an image forming unit 23, a sheet supply unit 24, a sheet ejection unit 25, a network communication interface (UF) 26, a telephone line communication interface (UF) 27, and a storage unit 28 are connected to the I/O 20D.

The operation display unit 21 includes, for example, various buttons such as a start button for instructing the start of copying and a ten-key, a setting screen for setting various image forming conditions such as copy density, and a touch panel for displaying various screens of a state of an apparatus and like, and the like.

The image scanning unit 22 includes an image scanning sensor such as a line CCD and a scanning mechanism for scanning the image scanning sensor, and has a function as a so-called scanner that scans an image of a document set in the apparatus.

The image forming unit 23 has a function of forming an image on a recording medium, for example, by a so-called electrophotographic method. Specifically, the image forming unit 23 includes a charging device that charges a photoconductor drum, an exposure device that forms an electrostatic latent image corresponding to an image on the photoconductor drum by exposing the charged photoconductor drum with light corresponding to the image, a developing device that develops the electrostatic latent image formed on the photoconductor drum with toner, and a transfer device that transfers a toner image corresponding to the image formed on the photoconductor drum to a recording medium, and a fixing device that fixes the toner image corresponding to the image transferred to the recording medium. Examples of the exposure device include an optical scanning device including an optical system such as a semiconductor laser, a rotating polymorphic mirror, a collimator lens, a cylindrical lens, and an fθ lens, or an LED head including a plurality of LEDs. The image forming unit 23 may be configured to form the image on the recording medium by an inkjet recording method.

The sheet supply unit 24 includes a sheet tray in which a recording sheet is stored, a supply mechanism for supplying the recording sheet from the sheet tray to the image forming unit 23, and the like.

The sheet ejection unit 25 includes an ejection tray from which the recording sheet is ejected, an ejection mechanism for ejecting the recording sheet on which the image is formed by the image forming unit 23 onto the ejection tray, and the like.

The network communication interface OF 26 is an interface for performing data communication with an external apparatus via a network (not shown).

The telephone line communication interface OF 27 is an interface for performing facsimile communication with another image forming apparatus connected via a telephone line (not shown).

The storage unit 28 stores log data 28D related to various processing results such as copying, facsimile communication, and printing, and an image forming program 28P to be described later.

The image forming program 28P may be stored in a non-volatile non-transitory recording medium, may be distributed via a network, and may be appropriately installed in the image forming apparatus 10.

Examples of the non-volatile non-transitory recording medium include a compact disc read only memory (CD-ROM), a magneto-optical disc, an HDD, a digital versatile disc read only memory (DVD-ROM), a flash memory, a memory card, and the like.

Figure 2:
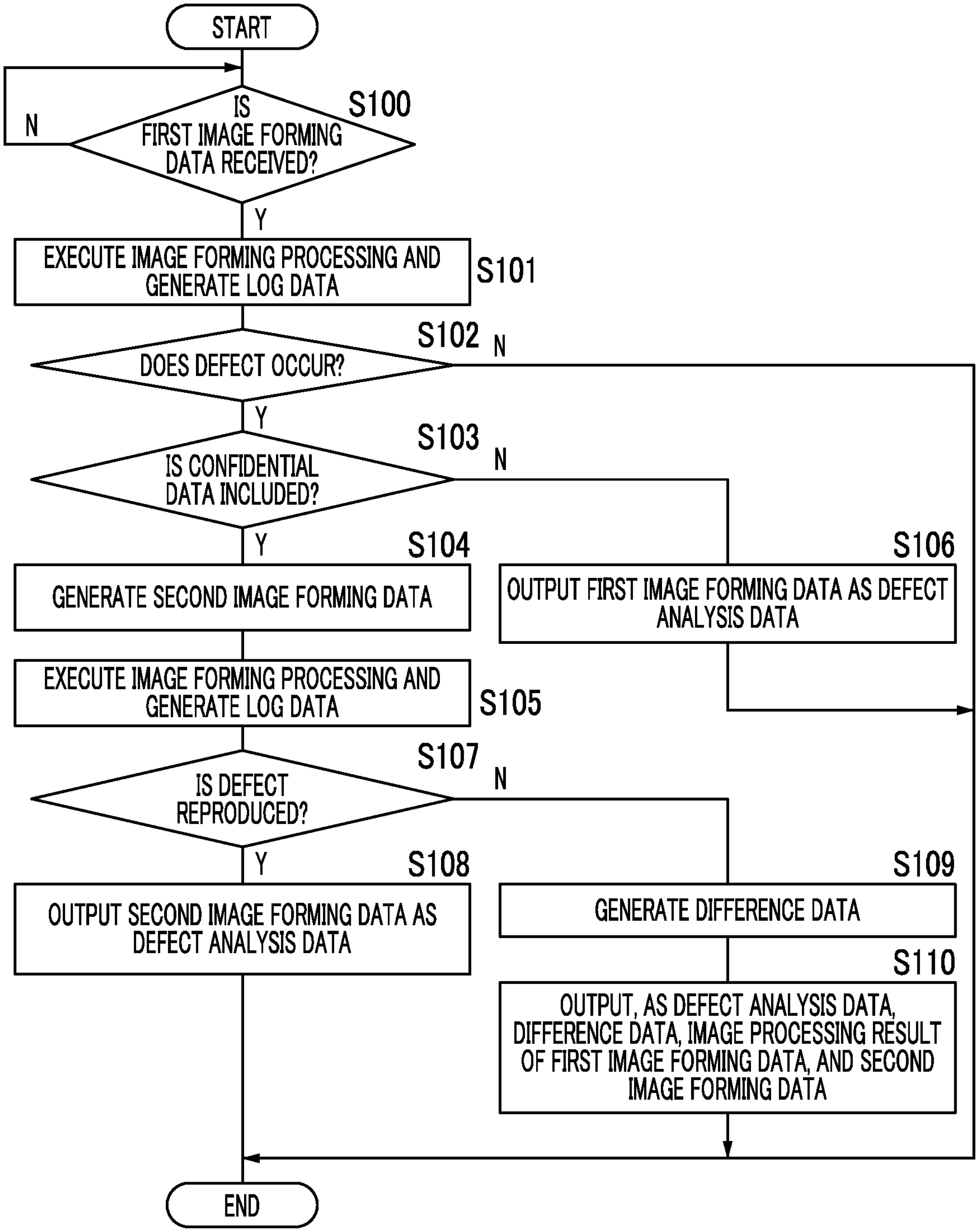
FIG. 2 is a flowchart showing an example of image forming processing.

Next, image forming processing executed by the CPU 20A of the image forming apparatus 10 will be described with reference to a flowchart shown in FIG. 2.

In step S100, the CPU 20A determines whether or not first image forming data is received. The first image forming data includes data such as text and an image to be printed on the recording sheet, and is transmitted from, for example, an external apparatus via the network communication interface I/F 26.

For example, in a case where the first image forming data is received from the external apparatus via the network communication interface I/F 26, the CPU proceeds to step S101, and in a case where the first image forming data is not received, the CPU waits until the first image forming data is received.

In step S101, the CPU 20A executes the image forming processing based on the first image forming data received in step S101. Specifically, for example, the image forming unit 23 is controlled such that the image is formed on the recording sheet based on the first image forming data received in step S101. The log data 28D in the image forming processing is stored in the storage unit 28. Here, the log data includes a processing result of each processing of a series of processing in the image forming processing, the presence or absence of occurrence of a defect, the content of the defect in a case where the defect occurs, and the like. The defect includes, for example, various defects such as a defect that occurs in various kinds of image processing performed on the received first image forming data, a defect that occurs in sheet supply processing in the sheet supply unit 24, and a defect that occurs in the image forming processing in the image forming unit 23, and a defect that occurs in a sheet ejection processing in the sheet ejection unit 25.

In step S102, the CPU 20A determines whether or not the defect occurs in the image forming processing of step S101. In a case where the defect occurs in the image forming processing in step S101, the CPU proceeds to step S103, and in a case where the defect does not occur, the CPU ends this routine.

In step S103, the CPU 20A determines whether or not the first image forming data includes confidential data. Here, the confidential data is data not to be disclosed to an unspecified person. Examples of the confidential data include personal data. Here, the personal data is information that can specify a person, and includes at least one piece of information such as a name, an address, or a telephone number. Although various known methods can be used as a method for determining whether or not the first image forming data includes the confidential data, in a case where the confidential data is personal data, for example, the CPU determines whether or not at least one piece of information such as a name, an address, or a telephone number is included in the first image forming data. The confidential data is not limited to the personal data, and may be, for example, external confidential data in a company.

In a case where the first image forming data includes the confidential data, the CPU proceeds to step S104, and in a case where the first image forming data does not include the confidential data, the CPU proceeds to step S106.

Figure 3:
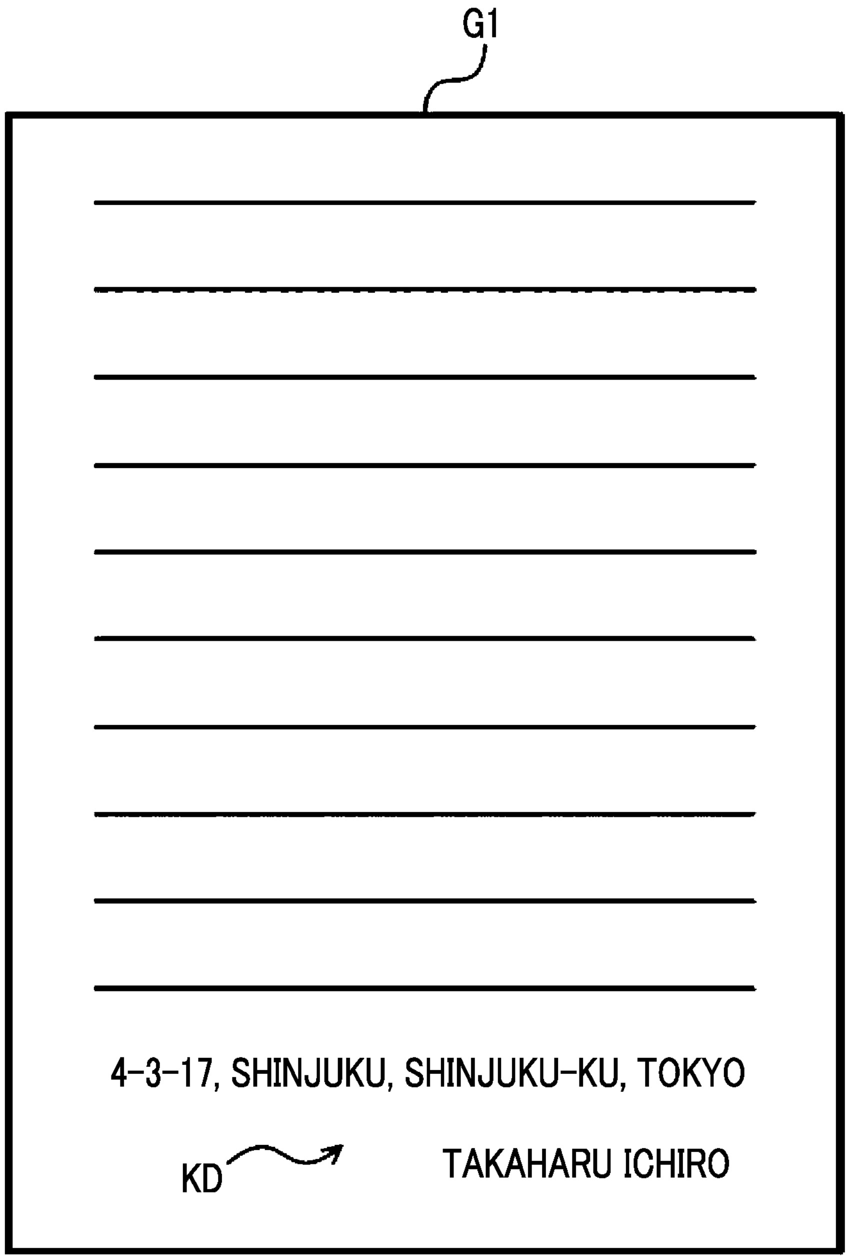
FIG. 3 is a diagram showing an example of an image formed on a recording sheet based on first image forming data.
Figure 4:
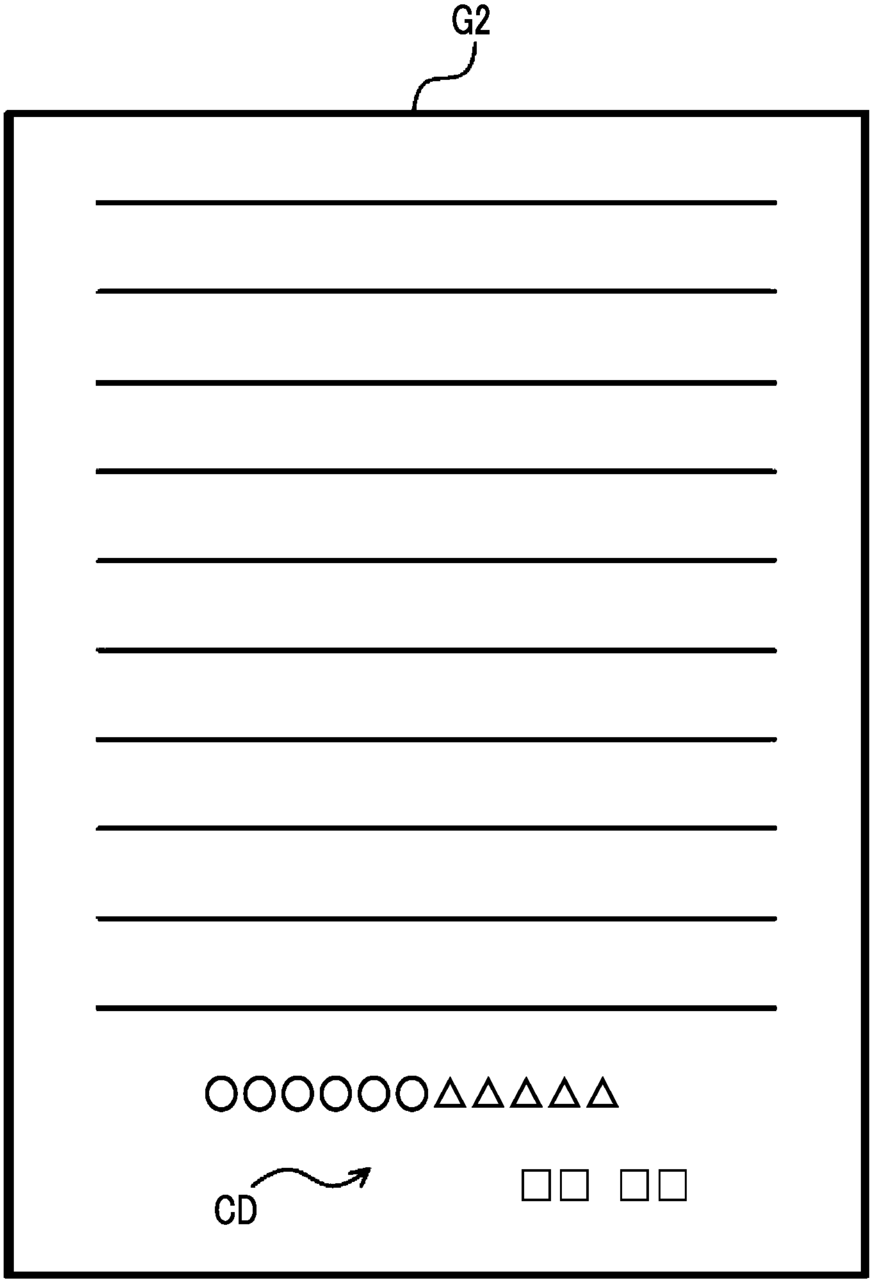
FIG. 4 is a diagram showing an example of an image formed on a recording sheet based on second image forming data.

In step S104, the CPU 20A generates second image forming data. Here, the second image forming data is defect analysis data in which the confidential data included in the first image forming data received in step S101 is invisible. Specifically, for example, in a case where the confidential data included in the first image forming data is the personal data, the personal data is replaced with replacement data that does not cause a problem even though the personal data is disclosed to an unspecified person. For example, as shown in FIG. 3, in a case where an image G1 formed on the recording sheet based on the first image forming data includes personal data KD, as shown in FIG. 4, the second image forming data is generated such that an image G2 obtained by replacing the personal data KD with replacement data CD. Various known methods can be used as the replacement method, and for example, the method described in JP2012-51296A can be used. The personal data may be deleted instead of replacing the personal data with the replacement data.

In step S105, the CPU 20A executes the image forming processing based on the second image forming data in the same manner as in step S101, and stores the log data 28D in the image forming processing in the storage unit 28.

In step S106, the CPU 20A outputs, as the defect analysis data, the first image forming data received in step S101. The CPU 20A may output the defect analysis data to the storage unit 28 and may store the data, or may transmit the data to an external apparatus via the network communication interface I/F 26.

In step S107, the CPU 20A determines whether or not the defect is reproduced, that is, whether or not a similar defect in a case where it is determined that the defect occurs in step S102 occurs. Specifically, for example, it is specified whether or not the defect is reproduced by using a comparison result between the log data recorded in the image forming processing of the first image forming data and the log data recorded in the image forming processing of the second image forming data. More specifically, for example, it is assumed that the defect is reproduced in a case where comparison results between pieces of log data in a past predetermined period including a point in time when the defect occurs match. In a case where the defect is reproduced, the CPU proceeds to step S108, and in a case where the defect is not reproduced, the CPU proceeds to step S109.

In step S108, the CPU 20A outputs, as the defect analysis data, the second image forming data generated in step S104. Similarly to step S106, the CPU 20A may output the defect analysis data to the storage unit 28 and may store the data, or may transmit the data to an external apparatus via the network communication interface OF 26. In the case where the defect is reproduced in this way, the second image forming data in which the confidential data is replaced with the replacement data is output. That is, the second image forming data for which it is determined that the defect is reproduced is output. Thus, it is not necessary to check again whether or not the defect is reproduced on a side on which the defect is analyzed, and the analysis of the defect may be performed efficiently.

In step S109, the CPU 20A generates difference data representing a difference between the first image forming data received in step S101 and the second image forming data generated in step S104. Here, the difference data is data including the confidential data included in the first image forming data and the replacement data with which the confidential data is replaced. That is, the difference data is data indicating which data of the first image forming data is changed and how.

In step S110, the CPU 20A outputs the log data that is the processing result of the image forming processing of the first image forming data executed in step S101, the difference data generated in step S109, and the defect analysis data including the second image forming data generated in step S104. Similarly to step S106, the CPU 20A may output the defect analysis data to the storage unit 28 and may store the data, or may transmit the data to an external apparatus via the network communication interface OF 26. As described above, even in a case where the defect is not reproduced, since the analysis of the defect is useful for analyzing the defect, including the log data which is the processing result of the image forming processing of the first image forming data, the difference data, and the second image forming data is output, the defect may be efficiently analyzed on the side on which the defect is analyzed. In the present exemplary embodiment, although a case where the defect analysis data including the log data which is the processing result of the image forming processing of the first image forming data, the difference data, and the second image forming data is output has been described, the defect analysis data including the difference data and the second image forming data may be output without including the log data which is the processing result of the image forming processing of the first image forming data.

In the above description, although the technology of the present disclosure has been described in detail with respect to a specific exemplary embodiment, the technology of the present disclosure is not limited to such an exemplary embodiment, and various other exemplary embodiments can be taken within the scope of the technology of the present disclosure.

In the above-described exemplary embodiment, although the processing performed by executing the program stored in the storage unit has been described, the processing of the program may be realized by hardware.

The processing in the above-described exemplary embodiment may be stored as a program in a storage medium such as an optical disk and may be distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Supplementary Note (((1)))

An image forming apparatus comprising:

a processor configured to:

- generate second image forming data for defect analysis in which confidential data included in first image forming data is invisible in a case where a defect occurs in image forming processing of the first image forming data;
- execute the image forming processing for the generated second image forming data; and
- output defect analysis data corresponding to a processing result of the image forming processing executed for the second image forming data.

(((2)))

The image forming apparatus according to (((1))), wherein the processor is configured to:

output the defect analysis data including the second image forming data in a case where the defect is reproduced in the image forming processing of the second image forming data.

(((3)))

The image forming apparatus according to (((1))), wherein the processor is configured to:

output the defect analysis data including difference data indicating a difference between the first image forming data and the second image forming data and the second image forming data in a case where the defect is not reproduced in the image forming processing of the second image forming data.

(((4)))

The image forming apparatus according to (((3))), wherein the processor is configured to:

output the defect analysis data further including a processing result of the image forming processing of the first image forming data.

(((5)))

The image forming apparatus according to any one of (((2))) to (((4))), wherein the processor is configured to:

specify whether or not the defect is reproduced by using a comparison result between log data recorded in the image forming processing of the first image forming data and log data recorded in the image forming processing of the second image forming data.

(((6)))

The image forming apparatus according to any one of (((1))) to (((5))), wherein the confidential data is personal data that is able to specify a person.

(((7)))

An image forming program causing a computer to execute:

generating second image forming data for defect analysis in which confidential data included in first image forming data is invisible in a case where a defect occurs in image forming processing of the first image forming data;

executing the image forming processing for the generated second image forming data; and outputting defect analysis data corresponding to a processing result of the image forming processing executed for the second image forming data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a processor configured to:

receive first image forming data for executing a first image forming processing;

generate second image forming data for executing a second image forming processing in a case where a defect occurs in the first image forming processing of the first image forming data, wherein the second image forming data is generated such that confidential data included in the first image forming data is made invisible by being replaced with replacement data;

execute the second image forming processing on the generated second image forming data; and output defect analysis data for performing defect analysis according to a processing result of the second image forming processing executed on the second image forming data, wherein the defect analysis data includes the second image forming data in a case where the defect is reproduced in the second image forming processing executed on the second image forming data, and the defect analysis data includes difference data indicating a difference between the first image forming data and the second image forming data in a case where the defect is not reproduced in the second image forming processing executed on the second image forming data, the difference data being data including the confidential data included in the first image forming data and the replacement data with which the confidential data is replaced.

2. The image forming apparatus according to claim 1, wherein the defect analysis data further includes a processing result of the first image forming processing of the first image forming data in the case where the defect is not reproduced in the second image forming processing of the second image forming data.

3. The image forming apparatus according to claim 2, wherein the processor is configured to:

specify whether or not the defect is reproduced by using a comparison result between log data recorded in the first image forming processing of the first image forming data and log data recorded in the second image forming processing of the second image forming data.

4. The image forming apparatus according to claim 1, wherein the processor is configured to:

specify whether or not the defect is reproduced by using a comparison result between log data recorded in the first image forming processing of the first image forming data and log data recorded in the second image forming processing of the second image forming data.

5. The image forming apparatus according to claim 1, wherein the confidential data is personal data that is able to specify a person.

6. A non-transitory computer readable medium storing an image forming program causing a computer to execute:

receiving first image forming data for executing a first image forming processing;

generating second image forming data for executing a second image forming processing in a case where a defect occurs in image forming processing of the first image forming data, wherein the second image forming data is generated such that confidential data included in the first image forming data is made invisible by being replaced with replacement data;

executing the second image forming processing on the generated second image forming data; and outputting defect analysis data for performing defect analysis according to a processing result of the second image forming processing executed on the second image forming data, wherein the defect analysis data includes the second image forming data in a case where the defect is reproduced in the second image forming processing executed on the second image forming data, and the defect analysis data includes difference data indicating a difference between the first image forming data and the second image forming data in a case where the defect is not reproduced in the second image forming processing executed on the second image forming data, the difference data being data including the confidential data included in the first image forming data and the replacement data with which the confidential data is replaced.

7. An image forming method comprising:

receiving first image forming data for executing a first image forming processing;

generating second image forming data for executing a second image forming processing in a case where a defect occurs in image forming processing of the first image forming data, wherein the second image forming data is generated such that confidential data included in the first image forming data is made invisible by being replaced with replacement data;

executing the second image forming processing on the generated second image forming data; and outputting defect analysis data for performing defect analysis according to a processing result of the second image forming processing executed on the second image forming data, wherein the defect analysis data includes the second image forming data in a case where the defect is reproduced in the second image forming processing executed on the second image forming data, and the defect analysis data includes difference data indicating a difference between the first image forming data and the second image forming data in a case where the defect is not reproduced in the second image forming processing executed on the second image forming data, the difference data being data including the confidential data included in the first image forming data and the replacement data with which the confidential data is replaced.

* * * * *